(12) United States Patent
Yera

(10) Patent No.: US 6,231,118 B1
(45) Date of Patent: May 15, 2001

(54) MANUALLY OPERABLE SUNSHADE FOR A SUNROOF

(75) Inventor: John M. Yera, Brighton, MI (US)

(73) Assignee: Sarnamotive Blue Water, Inc., Marysville, MI (US)

( * ) Notice: Subject to any disclaimer, the term of this patent is extended or adjusted under 35 U.S.C. 154(b) by 0 days.

(21) Appl. No.: 09/281,374

(22) Filed: Mar. 30, 1999

(51) Int. Cl.[7] ............................................. B60J 7/00
(52) U.S. Cl. ...................... 296/214; 296/216.09; 49/63
(58) Field of Search .................. 296/216.04, 216.06, 296/214, 216.09; 49/63

(56) References Cited

U.S. PATENT DOCUMENTS

| 1,733,666 | 10/1929 | Kersting . |
| 2,504,510 | 4/1950 | Ernest . |
| 2,616,755 | 11/1952 | Amato et al. . |
| 2,692,794 | 10/1954 | West . |
| 2,874,421 | 2/1959 | Nardulli . |
| 3,558,183 | 1/1971 | Sigmund . |
| 3,671,997 | 6/1972 | Sigmund . |
| 4,274,672 | 6/1981 | Kuroda . |
| 4,935,986 | 6/1990 | Church et al. . |
| 4,936,623 | * 6/1990 | Huyer .................................. 296/220 |
| 5,005,899 | 4/1991 | Clenet . |
| 5,104,178 | 4/1992 | Bienert . |
| 5,114,208 | 5/1992 | Ikeda et al. . |
| 5,149,170 | 9/1992 | Matsubara et al. . |
| 5,558,394 | 9/1996 | Mori et al. . |
| 5,609,387 | * 3/1997 | Stallfort et al. ...................... 296/214 |
| 5,671,969 | * 9/1997 | Sutor et al. .......................... 296/214 |

* cited by examiner

Primary Examiner—Joseph D. Pape
(74) Attorney, Agent, or Firm—Young & Basile, P.C.

(57) ABSTRACT

A sliding sunshade for placement in a sunroof frame along the perimeter of an opening in a roof of a vehicle. The sunshade includes a planar rectangular panel and bow-shaped spring located at each corner of the lateral edges of the panel. The planar panel and springs are integrally connected and molded from plastic as a single unit. The springs slide in the frame when assembled in the sunroof for maintaining a rattle-free condition of the panel.

17 Claims, 2 Drawing Sheets

MANUALLY OPERABLE SUNSHADE FOR A SUNROOF

FIELD OF THE INVENTION

The invention relates to a sunshade system for a vehicle.

BACKGROUND OF THE INVENTION

Conventionally, vehicle sunroofs with sunshades have been mounted in the roof of a vehicle such that the sliding roof member made of glass, synthetic resin or the like could be moved forwardly and rearwardly to open and close the sunroof system.

The slidable member moves in a frame that is installed into a cut out section of the roof of the vehicle. The frame is usually made of a metal material or plastic material and defines the boundaries of the opening and of the sunshade. The sunshade laterally moves within the confines of the frame. In previous embodiments, various components were attached to the lateral edges of the sunshade to facilitate the sliding motion and to prevent rattles from occurring. The sunroofs are held within the side rails by separate springs or slide shoe structures attached to the retractable sunroof assembly. One such structure is disclosed in U.S. Pat. No. 3,558,183 to Sigmund. In this disclosure, the structure is arranged to have at least one separate prestressed spring attached thereon.

U.S. Pat. No. 4,274,672 discloses a sunshade that has sliders extending along the lateral ends of the sunshade for slidably engaging into a guide groove of the sunshade frame. Stay members are mounted at each side of the front of the sliding roof sunshade.

SUMMARY OF THE INVENTION

It is the object of the present invention to eliminate the separate stay member, springs, slide shoe structure or other components that need to be assembled with the sunshade.

It is further an object to provide a sunshade which is a unitary piece having integral side or lateral springs molded thereon.

It is still another object of the invention to provide a sunshade that minimizes manufacturing and assembly time and also simplifies the assembly process.

A further object of the invention is to provide a cost-effective sunroof assembly that also provides a means for minimizing storage space by providing the unitary structure for the sliding sunshade.

It is further an object to keep lost parts at a minimum at the manufacturing and assembly locations. In the past many springs required for attachment to the lateral sides of the sunshade would be misplaced during transit or at the assembly site, therefore incurring loss of revenue. As a result, lost man-hours is also kept to a minimum by keeping the search for alternative or replacement springs an unnecessary task.

The present invention provides a sunshade that is manufactured by injection molding that includes an integral spring for maintaining the sunshade within rails of a sunroof frame located in an aperture of a vehicle.

The present invention further provides a rattle-free sliding roof made from a unitary member. The present invention provides a sunshade that can be easily installed within a sunroof frame while also eliminating the cost of the spring clips and their installation.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
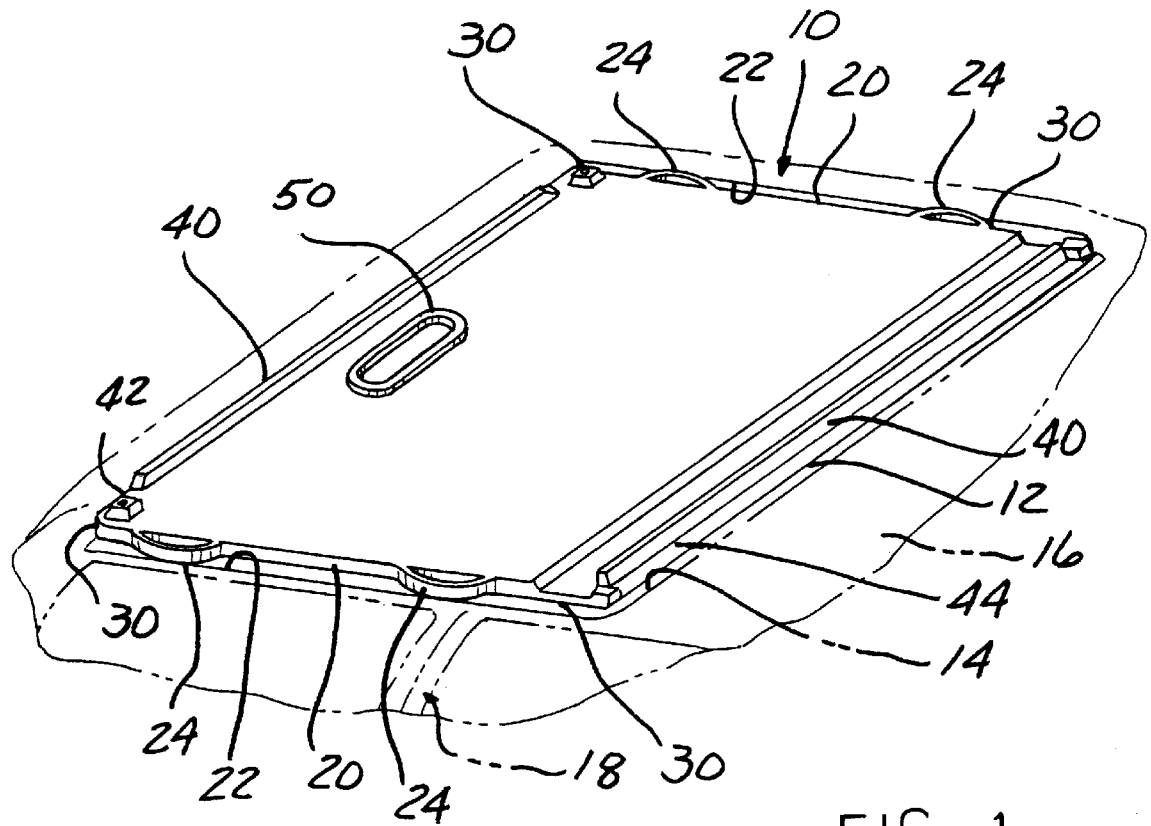
FIG. 1 is a perspective side view of the sliding sunshade member in accordance with the present invention for placement within the sunroof in the aperture of a roof of a vehicle.
Figure 2:
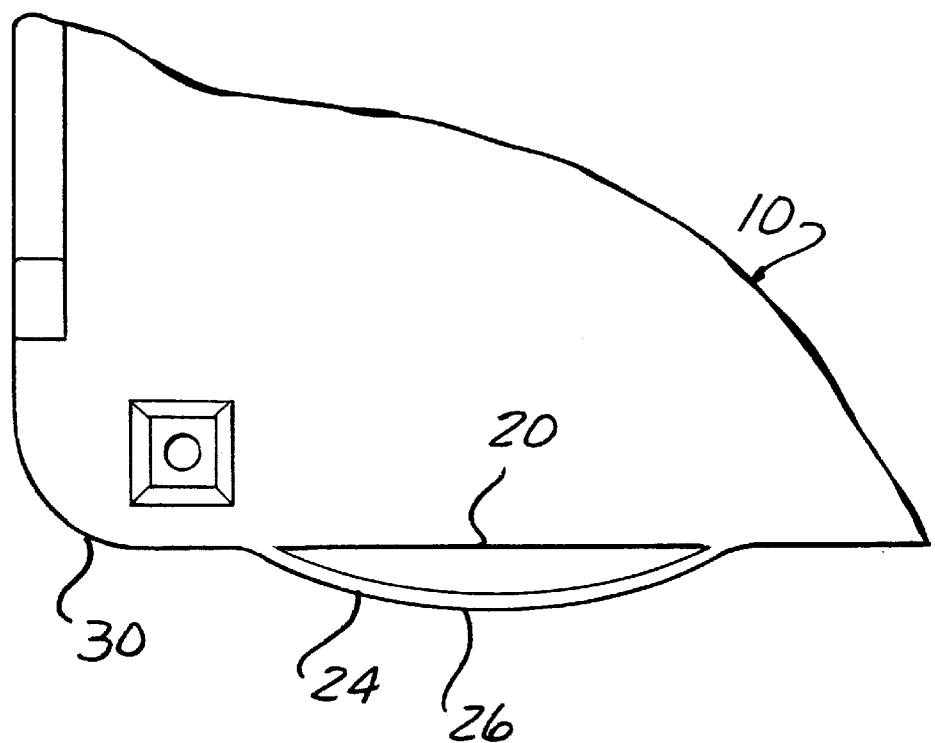
FIG. 2 is a plan view of the spring used in the sliding sunshade member of FIG. 1.

FIGS. 1 and 2 show a sliding sunshade 10 of the first embodiment of the present invention. The sliding sunshade 10 of the present invention is configured to be positioned within a frame 12 around the periphery of a cut-out or opening 14 in the roof 16 of a vehicle 18. The lateral sides 20 of the sliding sunroof member 10 are generally movable within guides 22 of the frame 12. Along the lateral sides 20 of the sliding sunshade member 10 are spring means 24 integrally molded to the sliding sunroof member 10. The springs 24 provide reciprocal movement within the guides 22 of the frame 12 and maintain the sunroof member 10 in a rattle-free condition within the confines of the frame 12. The spring 24 consists of a bow configuration that extends away from the lateral side 20 of the sliding sunshade member 10. The center rounded portion 26 of the bow spring 24 is in contact with an inner surface (not shown) of the frame 12 when installed in the roof 16 of the vehicle 18. As the bow spring 24 engages the inner surface of the frame 12, the center rounded portion 26 of the bow spring 24 slightly flattens against the inner surfaces and provides tension such that the sliding sunshade member 10 does not rattle or move in other than a lateral direction while in the frame 12.

As shown in FIG. 1, there are preferably four bow springs 24 integrally extending from the lateral sides 20 of the sliding sunshade member 10. Preferably, two springs 24 are located along each lateral side 20 of the sunshade member 10. Further, it is preferable to place each spring 24 proximate to each corner 30 of the sunshade member 10. The location of the springs 24 prevents a rocking motion of the sunshade member as it is sliding within the frame 12. A rocking motion or rattle of the sunshade member 10 could occur if a single spring was located in the center of the lateral side 20.

Figure 3:
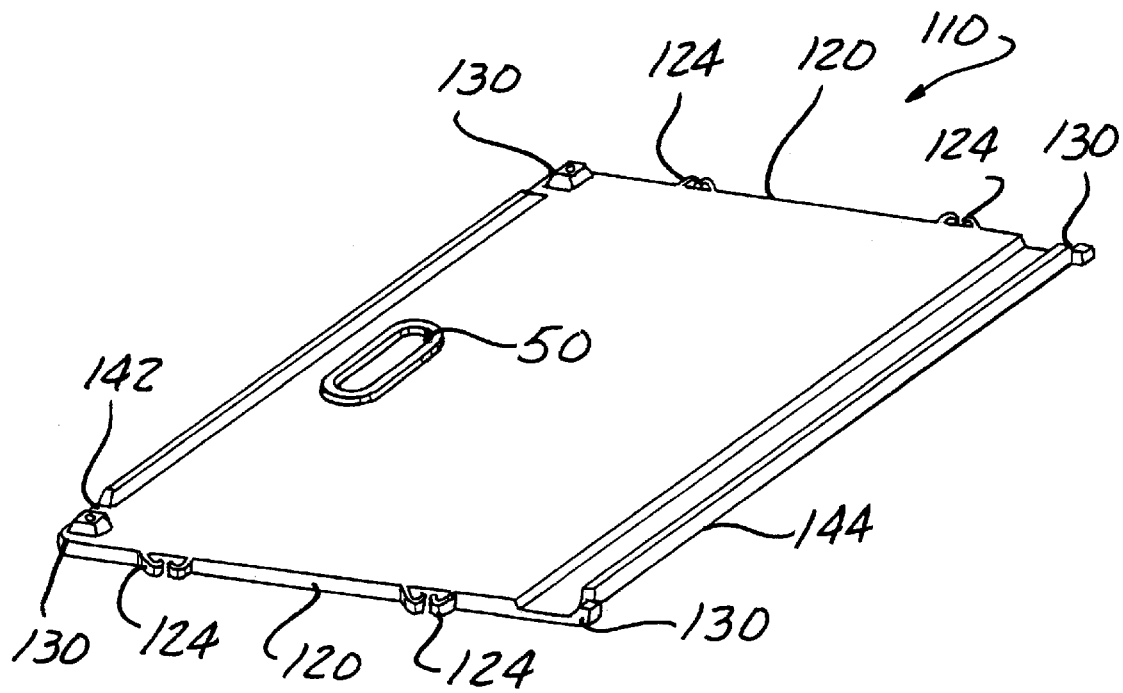
FIG. 3 is a perspective view of another embodiment of the sliding sunshade.
Figure 4:
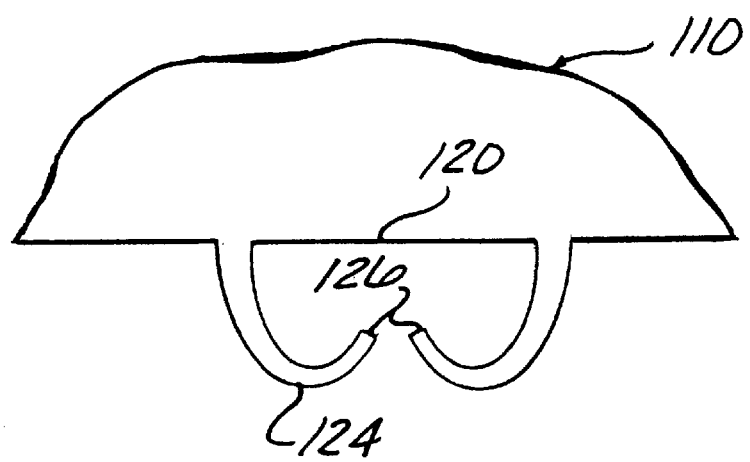
FIG. 4 is a plan view of the spring used with the sliding sunshade of FIG. 3.

A second embodiment of an integral spring for the sliding sunshade member 110 wherein the spring 124 is molded as one piece with the sunroof member 110 is shown in FIGS. 3 and 4. The second embodiment of the spring 124 has a ram's horn configuration. The ram's horn configuration is similar to a pair of C-springs having their exposed ends 126 facing each other. The ram's horn spring 124 is situated and located along the lateral edges 120 of the panel member 110 similarly to that of the first embodiment. It is preferred to locate the springs 124 adjacent or proximate to the corners 130 of the panel 110 along the lateral edges 120 such that torsional stress is minimized on the panel 110 as it is opened and closed.

Although two configurations of the preferred embodiment for a spring is disclosed, other configurations are envisioned. One configuration could include a single C-spring. Another configuration could include the C-spring with a 90° corner or other angle. The aforementioned configurations do not provide the same benefits and advantages as those of the first two embodiments. In the aforementioned configurations, the exposed end of the C-spring could get caught in the frame guide or held by imperfections in the frame during movement of the sunshade member 10, 110. The configurations having 90° or other angled edges do not provide the same amount of flexibility and are prone to snap if there is too much tension.

The sunshade member along with its integral springs are molded from a plastic and preferably a thermoplastic material as one piece to minimize stress points. Other features may be integrally included on the sunshade member 10 and 110. Other features include stabilizing ribs 40 located along the front and rear sides, 42, 44 respectively on sunroof member 10 and 142, 144 respectively on sunroof member 110. Also, a through hole or indented portion for a handle 50 may be molded into the sunshade member 10, 110.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sliding sunshade for a sunroof of a vehicle, the sunroof having a frame along the periphery of a cutout in the roof, the sunshade comprising:

a molded panel for slidably disposing within the frame, said molded panel having an integrally molded bow-like spring extending from said panel for disposing into the frame.

2. The sliding sunshade of claim 1, wherein the panel has lateral edges for reciprocally sliding within the frame and wherein the spring extends from at least one of the lateral edges.

3. The sliding sunshade of claim 2, wherein the panel is made from a thermoplastic material.

4. The sliding sunshade of claim 2, wherein the spring is located proximate to a corner of the panel.

5. The sliding sunshade of claim 2, wherein the panel has an integrally molded indented feature located proximate to a front edge of the panel for a handle.

6. The sliding sunshade of claim 2, wherein the spring has a continuous bow-shaped configuration.

7. The sliding sunshade of claim 2, wherein the spring has a discontinuous bow-shaped configuration.

8. The sliding sunshade of claim 2, wherein the spring has a ram's horn configuration.

9. A sliding sunshade for placement in a frame along the perimeter of an opening in a roof of a vehicle, the sunshade comprising:

a planar rectangular panel for opening and closing the roof opening integrally molded with a spring extending therefrom for maintaining a rattle-free condition of the panel in the roof opening.

10. The sliding sunshade of claim 9, wherein the panel and spring are molded from a single plastic material.

11. The sliding sunshade of claim 10, wherein the plastic material is a thermoplastic material.

12. The sliding sunshade of claim 10, wherein the spring has a bow-shaped configuration.

13. The sliding sunshade of claim 10, wherein the spring has a pair of C-springs having open portions of each C-spring adjacent and facing each other.

14. The sliding sunshade of claim 10, wherein the spring has a ram's horn configuration.

15. The sliding sunshade of claim 10, wherein the panel has a pair of lateral edges, a front edge and a rear edge and wherein the spring is located on the lateral edge.

16. The sliding sunshade of claim 15, wherein a spring is located adjacent to a corner of the panel along each lateral edge.

17. The sliding sunshade of claim 11, wherein a handle having a recessed formation is integrally molded into the panel.

* * * * *